United States Patent [19]
Schwartz et al.

[11] Patent Number: 5,673,195
[45] Date of Patent: Sep. 30, 1997

[54] COMPACT DISC TRACKING SYSTEM AND METHOD

[76] Inventors: Vladimir Schwartz, 12 Revolutionary Rd.; Michael Schwartz, 314 Bedford St., both of Lexington, Mass. 02173; Klaus Bierwagen, 45 Wadsworth Ave., Waltham, Mass. 02154

[21] Appl. No.: 489,484

[22] Filed: Jun. 12, 1995

[51] Int. Cl.$^6$ .................................................. G06F 19/00
[52] U.S. Cl. .................. 364/468.22; 364/478.13; 364/468.24
[58] Field of Search ................. 364/468.22, 468, 364/478, 468.23, 468.19, 468.24, 468.28, 478.01, 478.13, 478.14, 478.16; 198/345.3; 455/604; 483/15; 214/588 B; 395/82; 269/47, 52, 74, 900, 909; 312/9.1; 235/375, 385

[56] References Cited

U.S. PATENT DOCUMENTS

| | | | |
|---|---|---|---|
| 3,796,327 | 3/1974 | Meyer et al. | 214/38 BB |
| 4,630,216 | 12/1986 | Tyler et al. | 364/478 |
| 4,821,198 | 4/1989 | Takeuchi et al. | 364/468 |
| 4,843,640 | 6/1989 | Jeungel | 455/604 |
| 5,242,043 | 9/1993 | Sturm | 198/345.3 |
| 5,353,230 | 10/1994 | Maejima et al. | 364/468 |
| 5,374,231 | 12/1994 | Obrist | 483/15 |
| 5,474,166 | 12/1995 | Santandrea et al. | 198/345.3 |

*Primary Examiner*—Joseph Ruggiero
*Attorney, Agent, or Firm*—Edgar H. Haug; Curtis, Morris & Safford, P.C.

[57] ABSTRACT

A system and method for tracking compact discs during manufacture comprising a spindle having a central shaft and a base for carrying a plurality of compact discs, electronic memory storage system connected to the spindle, and data transfer means cooperating with the spindle to send and receive information identifying compact discs carried by the spindle and/or providing processing information about compact discs carried by the spindle from or to the electronic memory storage system.

25 Claims, 2 Drawing Sheets

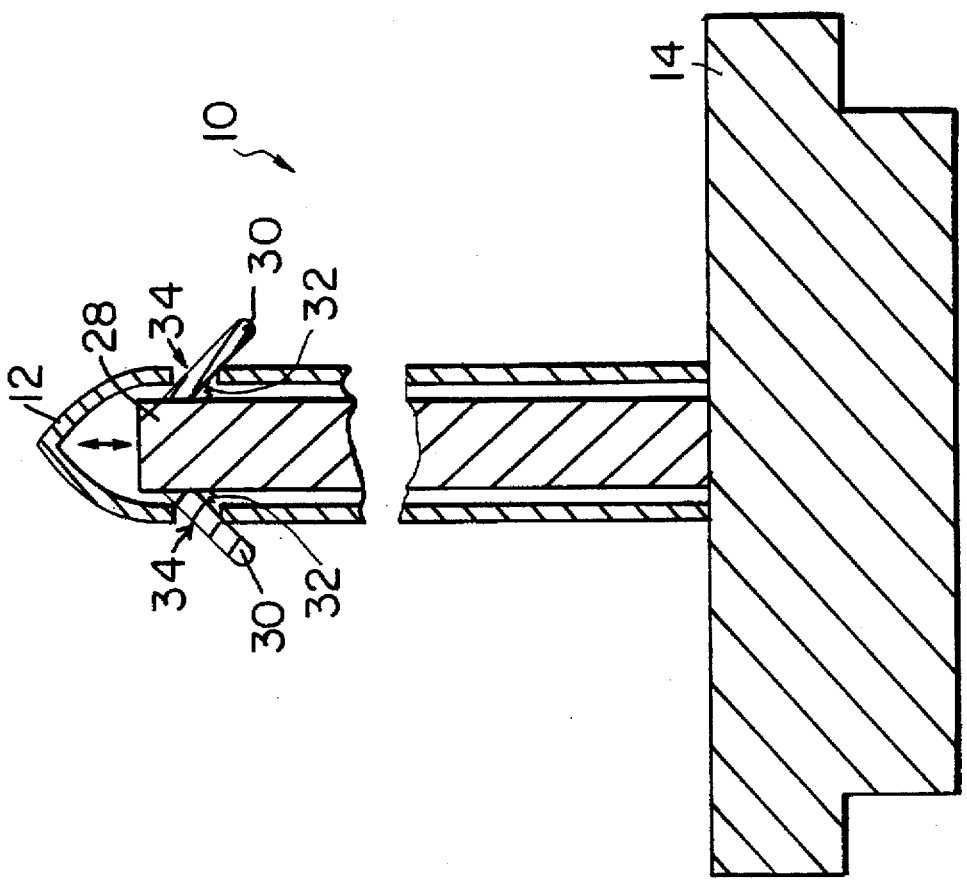
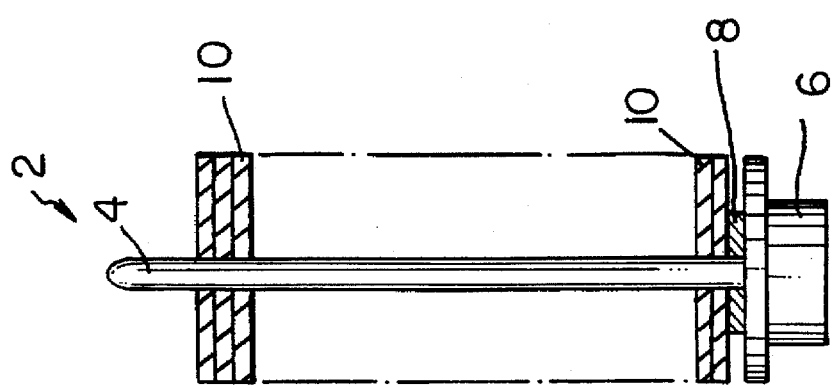

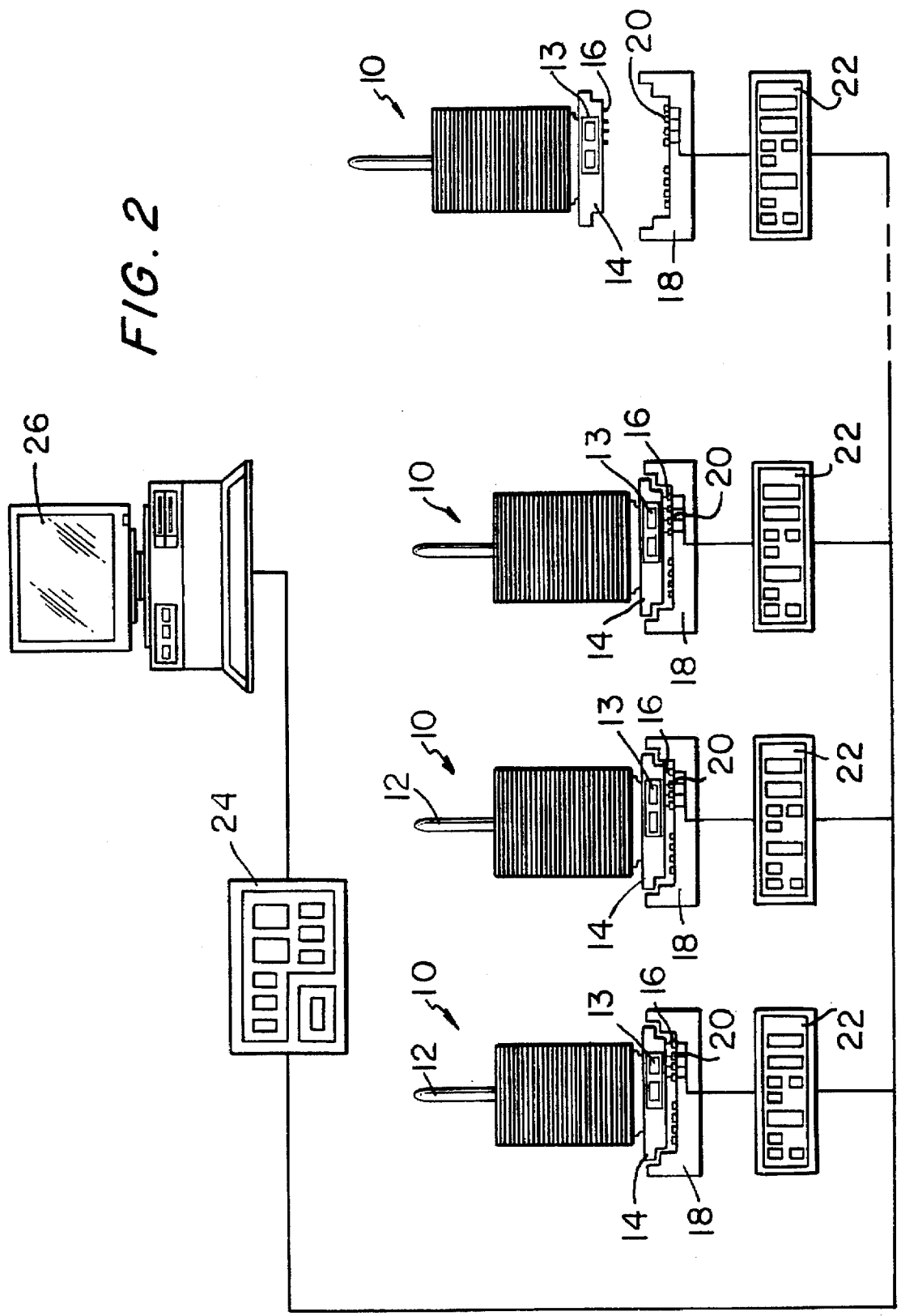

COMPACT DISC TRACKING SYSTEM AND METHOD

FIELD OF THE INVENTION

The present invention relates generally to compact disc manufacturing and more particularly to a system and method for tracking and identifying compact discs during manufacture and storage.

BACKGROUND OF THE INVENTION

When compact discs ("CDs") are manufactured, they are frequently transported and stored on spindles. Since each compact disc has a center hole, is relatively thin and is relatively light, storage of multiple discs on a spindle is convenient.

Spindles, as used in the manufacture of CDs, typically have a central post about two feet long and weighted base about two inches thick. The dimensions are generally intended to permit the spindle to accommodate about 200 CDs without tipping over. However, the particular dimensions may vary based on need or location.

Depending upon the level of automation of the CD manufacturing process, CDs may be stored or carried on spindles several times before printing or packaging. In the most fully automated processes, CDs are only kept on spindles between the inspection and printing steps and just prior to final packaging. In more manual systems, CDs may be placed on spindles between every manufacturing step including: between molding and metalizing, between metalizing and spin coating, between spin coating and inspection, between inspection and printing, and between printing and final packaging. However, regardless of the number of times the CDs are maintained on spindles, each such time the possibilities of theft and confusion as to title exist. In other words, whenever a CD is on a spindle, particularly without any identifying printing, the identification of the title on that spindle may easily be called into question.

Similarly, whenever CDs are maintained on a spindle for any length of time, theft can occur. Without any means of preventing unauthorized removal of CDs from the spindle or tracking exactly how many CDs were on the spindle, thefts regularly happen.

SUMMARY OF THE INVENTION

It is therefore an object of the present invention to overcome the drawbacks of the prior art.

It is another object of the present invention to provide means to identify CDs mounted on a spindle.

It is yet another object of the present invention to provide means to prevent theft of CDs from spindles.

The present invention comprises a modified spindle which is capable of electronically storing information about the CDs contained thereon as well as various statistics about their manufacture. The modified spindle also includes a locking device, which is, at least in part, influenced in its operation by the electronically stored information.

Preferably, an Electronic Erasable Programmable Read Only Memory ("EEPROM") module is placed in the base of each spindle of the present invention. A contact, connected to the EEPROM is also provided in the base, which fits into a corresponding contact in a data transfer station. The data transfer station, in turn, communicates with one or more interfaces which are ultimately connected to a central microprocessor.

In practice, at any convenient point in the production process, when CDs are stacked on a spindle of the present invention, the spindle may be placed in a data transfer station and data concerning the production and identification of the material on the CDs on the spindle is input into the EEPROM. From that point forward, the identification of the CDs (assuming of course, no human error) is assured and statistical data about the production and storage of groups of CDs can be obtained and used to improve the efficiency of the entire process.

Preferably, the present invention also includes a locking mechanism which maintains the CDs on the spindle until release is desired by an authorized person. Release is ordinarily effected by placing the spindle in a data transfer station and entering an authorizing release code. This causes the locking mechanism to retract or otherwise disengage so that CDs can be removed as desired.

As can be seen, the present invention provides the ability to track the production of CDs and eliminate confusion as to title. The data available through use of the present system can be used to pinpoint excessive production and storage costs and times. Finally, the present invention can also be used to prevent theft of CDs by locking them on the spindle until removal is properly authorized.

DESCRIPTION OF THE DRAWINGS

In the drawings:

FIG. 1 is a front view of a prior art spindle with a plurality of CDs thereon;

FIG. 2 is a schematic diagram of the configuration of the present invention; and FIG. 3 is a cross-sectional view of one embodiment of a locking mechanism of the present invention.

DETAILED DESCRIPTION

As shown in FIG. 1, a prior art spindle 2 comprises a central shaft 4 and a flattened, circular base 6. A plastic spacer 8 is used to space the stack of CDs 10 from the base 6 to prevent marring of the surface of the bottommost CD. The base is weighted to prevent the spindle 2, when filled with CDs, from tipping over.

As shown in FIG. 2, the present invention comprises a modified spindle 10 having a central shaft 12 and an EEPROM 13 mounted in or on its base 14. A set of contacts 16 is also provided on the base 14.

At least one data transfer station 18 is provided which is designed preferably in the form of a reception cup to accommodate the base 14 and provide a matching set of contacts 20 to the contacts 16 on the base 14. The contacts 20 in the transfer station 18 are connected to a peripheral data collection interface 22 which is in communication with a master data collection interface 24 associated with a central microprocessor 26.

A locking mechanism is also preferably included as part of the present invention. FIG. 3 shows one possible configuration for the locking mechanism of the present invention. As shown, a central drive rod 28 is coaxially located within the central shaft 12 of each spindle. A plurality of fingers 30, hingedly connected to the central drive rod 28 are biased away from the central shaft 12 by springs 32. The fingers 30 extend out of holes 34 in the central shaft 12 when the lock is activated and prevent a CD from being removed from the spindle. When the lock is deactivated, the fingers 30 are retracted against central drive rod 28, permitting CDs to be removed as desired.

In use, a spindle 10 is filled with CDs at a step in the production process. At a convenient point thereafter the full spindle 10 is placed in a data transfer station 18 and information about the stack of CDs is entered for storage on the EEPROM 13 in the base 14 of the spindle 10 via contacts 16 and 20. Alternatively, production and/or title identification information can be downloaded from the central microprocessor 26 automatically if the system tracks production from point-to-point or by manual selection from an array of choices based on previously input information.

Spindles can be pre-encoded rather than waiting for a post-production step. In one preferred approach, an ID number, which automatically matches the spindle with title identification and other information, is pre-loaded onto the EEPROM 13 by use of the data transfer station 18. This approach can be very effective when spindles are fed, in order, to a collection point at which each receives the sequential output of the production process or a production step. At any time thereafter, statistical information and/or title identification information can be automatically downloaded to the EEPROM. Alternatively, no information need ever be downloaded to the EEPROM. Rather, the ID number can be used to automatically "look-up" corresponding information stored by the central microprocessor 26. (The CD title or similar information could be used instead of an ID number for more simplistic systems.)

At any time after the necessary information has been loaded onto the EEPROM 13, a spindle 10 can be placed in a data transfer station 18 and information obtained about the CDs stacked on the spindle 10. This eliminates confusion as to title and production or inventory information associated with the spindle can be used to improve the overall operation of a facility.

The locking system is preferably activated and deactivated electronically via the data transfer station 18. More particularly, a locking/unlocking sequence, requiring entry of an authorization code can be used. In such cases, the spindle 10 would be placed in a data transfer station 18 and an authorization code would be put in via a keyboard or other input device (not shown). When the proper authorization code is entered, a signal from the EEPROM or passed via the EEPROM causes the central drive rod 28 to move up or down to lock or unlock the spindle 10. A small motor (not shown) or other appropriate device responsive to the signal from the EEPROM may be used to drive the central drive rod 28.

The activation and deactivation of the locking device need not depend upon an authorization code. Rather any desired trigger can be used. For example, if CDs are carried on spindles 10 throughout the production process, placement of a spindle 10 in a data transfer station 18 having a particular location ID or placement in a data transfer station 18 after a particular production sequence could automatically activate or deactivate the locking mechanism.

Preferably, a manual override is also provided for situations where the microprocessor station is unavailable or inaccessible. This manual override may take the form of a key which, via conventional gears, moves the central drive rod 28 up or down as appropriate.

While reference has been made to particular embodiments, structure and information, one of skill in the art may make modifications without departing from the spirit or intent of the invention. More particularly, a particular locking scheme has been disclosed, but alternative structures will occur to one of skill in the art.

We claim:

1. A system for tracking compact discs comprising:
   a spindle comprising a central shaft and a base for holding a plurality of compact discs thereon;
   memory means connected to said spindle;
   data transfer means selectively cooperative with said spindle to send and receive information identifying CDs carried by said spindle from or to said memory means; and
   locking means for preventing unauthorized removal or addition of CDs from or to said spindle wherein said locking means comprises finger projections which are moveable between a locking deactivated position, wherein said finger projections are contained within said central shaft of said spindle so that CDs can be removed from or inserted on said spindle, and a locking activated position, wherein said finger protections extend outwardly from said central shaft to thereby prevent CDs from being removed from said spindle.

2. A system according to claim 1, wherein said memory means is located in said base of said spindle.

3. A system according to claim 2, wherein said base includes contacts connected to said memory means.

4. A system according to claim 3, wherein said data transfer means includes contacts positioned to cooperate with said contacts on said base.

5. A system according to claim 4, wherein said contacts on said data transfer means communicate with a central microprocessor.

6. A system according to claim 5, wherein said microprocessor maintains information regarding the production of the CDs carried on said spindle.

7. A system according to claim 6, wherein said microprocessor transfers information regarding the production of the CDs carried on said spindle to said memory means via said data transfer means.

8. A system according to claim 5, wherein said microprocessor maintains information regarding the title of the CDs carried on said spindle.

9. A system according to claim 8, wherein said microprocessor transfers information regarding the title of the CDs carried on said spindle to said memory means via said data transfer means.

10. A system according to claim 5, wherein said memory means maintains a unique identification code.

11. A system according to claim 10, wherein said microprocessor maintains information keyed to said unique identification code and wherein said information comprises information identifying CDs carried by said spindle.

12. A system according to claim 10, wherein said microprocessor maintains information keyed to said unique identification code and wherein said information comprises information about the production of the CDs carried by said spindle.

13. A system according to claim 1, wherein said memory means is an EEPROM.

14. A system according to claim 1, wherein said data transfer means comprises a reception cup for receiving the base of said spindle.

15. A system according to claim 14, wherein said base comprises contacts cooperating with contacts in said data transfer means which cooperating contacts provide a communication path between said memory means and said microprocessor.

16. A system according to claim 1, wherein said locking means further comprises a central drive rod which is coaxially located with said central shaft of said spindle and which is hingedly connected to said finger projections, said finger projections being biased away from said central shaft by spring means, and said central drive rod being movable within said shaft to move said finger projections between said locking deactivated and activated positions to respectively unlock or lock the spindle.

17. A system according to claim 16, wherein said locking means is responsive to signals from said memory means.

18. A system according to claim 17, wherein said signals from said memory means are responsive to the input or recognition of an authorization code.

19. A system according to claim 18, wherein said authorization code can be conveyed via said data transfer means or said microprocessor.

20. A method of tracking compact discs during and after production comprising the steps of:
providing a spindle having a central shaft for carrying a plurality of CDs;
putting a plurality of CDs on said spindle;
storing information about the identity of the CDs carried on said spindle;
accessing the information about the identity of the CDs carried on the spindle by placing said spindle in a data transfer station; and
locking said CDs on said spindle for preventing unauthorized removal or addition of CDs by moving finger projections between a locking deactivated position, wherein said finger projections are contained within said central shaft of said spindle so that CDs can be removed or inserted on said spindle, and a locking activated position, wherein said finger projections extend outwardly from said central shaft to thereby prevent CDs from being removed from said spindle.

21. A method according to claim 20, wherein said information about the identity of said CDs carried on said spindle is stored on memory means incorporated into said spindle.

22. A method according to claim 21, further comprising the step of storing said information on said memory means by placing said spindle in communication with data transfer means communicating with a microprocessor.

23. A method according to claim 20, wherein said spindle incorporates memory means and wherein said information about the identity of said CDs carried on said spindle is stored on a central microprocessor selectively communicating with said memory means.

24. A method according to claim 23, wherein said memory means communicates with said microprocessor via data transfer means.

25. A method according to claim 24, further comprising the step of
releasing said CDs on said spindle after input or recognition of an authorization code.

* * * * *